United States Patent [19]

Young

[11] Patent Number: 5,084,360
[45] Date of Patent: Jan. 28, 1992

[54] PACKAGING MATERIALS

[75] Inventor: Daniel J. Young, Bridgwater, England

[73] Assignee: Courtaulds Films & Packaging (Holdings) Ltd., England

[21] Appl. No.: 692,468

[22] Filed: Apr. 23, 1991

[30] Foreign Application Priority Data

May 1, 1990 [GB] United Kingdom ............ 9009782.5

[51] Int. Cl.$^5$ ...................... B32B 27/32; B32B 27/08; C08L 23/16; C08L 23/20
[52] U.S. Cl. .................... 428/516; 525/240; 428/308.4
[58] Field of Search .............. 525/240; 428/516

[56] References Cited

U.S. PATENT DOCUMENTS

| 3,849,520 | 11/1974 | Bullard et al. | 525/240 |
| 4,230,767 | 10/1980 | Isaka et al. | 428/516 |
| 4,291,092 | 9/1981 | Weiner | 428/516 |
| 4,391,862 | 7/1983 | Bornstein et al. | 428/516 |
| 4,528,220 | 7/1985 | Hwo | 428/516 |
| 4,665,130 | 5/1987 | Hwo | 525/240 |

FOREIGN PATENT DOCUMENTS

| 54-052157 | 4/1979 | Japan . |
| 54-060348 | 5/1979 | Japan . |
| 1497577 | 1/1978 | United Kingdom . |

Primary Examiner—Carman J. Seccuro
Attorney, Agent, or Firm—Bacon & Thomas

[57] ABSTRACT

A heat sealable polymeric film, heat sealing being provided by a blend of (a) from 25 to 75 percent of propylene/ethylene copolymer containing from 2 to 8 percent by weight of units derived from ethylene, (b) from 1 to 60 percent of but-1-ene/ethylene copolymer containing up to 1 percent by weight of units derived from ethylene, and (c) from 1 to 60 percent of but-1-ene/ethylene copolymer containing from 3 to 10 percent by weight of units derived from ethylene, the percentages of the various copolymers being based on the total weight of the blend. Films of the invention have low heat seal threshold temperatures combined with broad ranges of continuous hot tack.

17 Claims, No Drawings

PACKAGING MATERIALS

This invention concerns heat sealable polymeric films, and more particularly heat sealable polyolefin films.

Various proposals have been made hitherto for imparting easy heat sealability to polyolefin films, and especially to oriented polypropylene films. In addition to the ability to form heat seals at relatively low temperatures, it is desirable that the contacting surfaces of the films have good hot tack to reduce the tendency for the surfaces to pull apart while they are still hot.

Oriented polypropylene films are usually rendered heat sealable by the provision of an outer layer consisting of at least one copolymer of propylene with at least one other aliphatic olefin, in particular ethylene and/or but-1-ene. Although layers consisting of propylene/ethylene copolymers alone have been proposed as heat seal layers, it has been proposed that good hot tack combined with the ability to form heat seals at relatively low temperatures can be achieved by the use of blends of polymers as the heat seal layer. British Patent Specification 1497577, for example, describes the use of blends of propylene/ethylene copolymers with polybut-1-ene. Blends of propylene/ethylene copolymers with polybut-1-ene are also described in Japanese Patent Specification 54060348 as having low temperature heat sealing properties, and such properties are also given in Japanese Patent Specification 54052157 for blends of propylene/ethylene copolymers with either propylene/but-1-ene copolymers or propylene/ethylene/but-1-ene copolymers.

According to the present invention there is provided a heat sealable polymeric film, heat sealing being provided by a blend of (a) from 25 to 75 percent of propylene/ethylene copolymer containing from 2 to 8 percent by weight of units derived from ethylene;

(b) from 1 to 60 percent of but-1-ene/ethylene copolymer containing up to 1 percent by weight of units derived from ethylene; and (c) from 1 to 60 percent of but-1-ene/ethylene copolymer containing from 3 to 10 percent by weight of units derived from ethylene;

the percentages of the various copolymers being based on the total weight of the blend.

Polymeric films in accordance with the present invention have shown low heat seal threshold temperatures combined with broad ranges of continuous hot tack when compared with films in which heat sealing is provided by blends of the propylene/ethylene copolymers used in accordance with the invention, with one or the other of the but-1-ene/ethylene copolymers used in accordance with the present invention.

In general, films of the present invention will include one or more other polymeric layers in addition to the blend. Since the blends of the present invention are in general more expensive than homopolymers, it is preferred to use a relatively thin layer of the blend on a relatively thick layer or layers of one or more other polymers, for example propylene homopolymers. Advantageously, films of the present invention consist of a relatively thick core layer having a layer of the blend forming outer surfaces on either side of the core layer. The blend forming outer surface of the film may, if desired, differ from that forming the other outer surface of the film. The relatively thick layer can, if desired, be voided, e.g. voided polypropylene, or it can be non-voided. If desired, combinations of voided and non-voided layers can be used to form the core of films in accordance with the present invention.

The propylene/ethylene copolymers of the blends used in accordance with the present invention form from 25 to 75 percent, preferably from 30 to 50 percent by weight, of the blends, the ethylene content of the copolymer should be from 2 to 8 percent by weight, preferably from 3.5 to 4.5 percent by weight. The melt flow index (ASTM D 1238-78, condition L) of the propylene/ethylene copolymers of the blends is preferably from 3 to 10, and more preferably from 5 to 8.

The but-1-ene/ethylene copolymer containing up to 1 percent by weight of units derived from ethylene form 1 to 60 percent, and preferably from 5 to 55 percent by weight of the blend. These copolymers usually will contain at least 0.05 percent by weight of units derived from ethylene, and preferably contain from 0.3 to 0.8 percent by weight of units derived from ethylene. The melt flow index (ASTM D 1238-78, condition L) of these polymers is preferably from 1.5 to 10, and more preferably from 3 to 6.

The but-1-ene/ethylene copolymer containing from 3 to 10 percent by weight of units derived from ethylene form from 1 to 60 percent, and preferably from 5 to 55 percent by weight of the blend. These copolymers preferably contain from 5 to 7 percent by weight of units derived from ethylene. The melt flow index (ASTM D 1238-78, condition L) of these copolymers is preferably from 3 to 40 and more preferably from 7 to 9.

The polymer blends of the present invention can be used with advantage as heat seal layers on polyolefin films, particularly on polypropylene films, and especially on oriented propylene homopolymer films.

The polymer blends of the present invention can be produced using known methods, for example mixing with high shear.

Polyolefin films in accordance with the invention incorporating a heat sealable layer of the blend can be produced using known methods, for example by coextrusion of a layer of the blend with a layer of an olefin homopolymer. Orientation of such films can be effected in known manner, for example sequentially in the machine and transverse directions using a stenter, or simultaneously using a bubble process.

As stated hereinbefore, films of the present invention have shown low heat seal threshold temperatures combined with wide ranges of continuous hot tack temperatures. In particular, heat seal strengths of greater than 200 g/25 mm have been achieved at temperatures of less than 95° C. in combination with continuous hot tack temperature ranges of from 75° to 130° C. This combination of heat sealing properties enables heat sealable films of the present invention to be used with both horizontal form fill and seal (HFFS) and vertical form fill and seal (VFFS) packaging machinery.

The following Examples are given by way of illustration only:

EXAMPLE 1

Comparison

A three layer polymer web was produced by coextruding a core layer of propylene homopolymer with outer layers thereon, one outer layer consisting of a propylene/ethylene random copolymer containing about 4 percent by weight of units derived from ethylene and having a melt flow index of about 7, and the other layer consisting of a two component blend of the propylene/ethylene random copolymer used for the other layer with a random copolymer of but-1-ene with ethylene, the but-1-ene/ethylene copolymer containing about 0.7 percent by weight of units derived from ethylene and having a melt flow index of about 4.5. The weight ratio of the propylene/ethylene copolymer to the but-1-ene/ethylene copolymer was 2:3.

The polymer web was then stretched in the machine direction at 105° C. using heated rolls to a stretch ratio of 4:1. Thereafter, the web was stretched in the transverse direction in a stenter oven at 160° C. and a stretch ratio of 8:1.

The resultant oriented film consisted of a core layer 23 microns thick, with each outer layer being 0.8 microns thick.

The heat seal threshold temperature (HSTT) of the outer layer consisting of the polymer blend was then evaluated by contacting two layers of film blend surface to blend surface under load and at different temperatures based on BS 1133-64). Contact was effected for one second over a rectangular area 25 mm × 15 mm using a heated jaw applied under a load of 100 KN/m$^2$. Once they had cooled, the two layers of film were then pulled apart, and the temperature at which it took a load of 200 g/25 mm seal length to separate the films was recorded as the heat seal threshold temperature of the blend. The results are shown in the Table.

The continuous hot tack temperature range (CHTTR) of the blend was evaluated by sealing the blend to itself using a pair of heated rectangular sealing jaws having a surface area of 30 mm × 15 mm, the sealing being effected at various temperatures and using a load of 450 KN/m$^2$ for a period of 0.8 seconds (based on Tappi T683).

A force of 440 N was used to pull the layers of film apart immediately upon opening of the sealing jaws, the force being applied to the 30 mm dimension of the seal. Hot tack was considered to be satisfactory of the seal pulled open by no more than 3 mm, and the temperature range over which this was observed was recorded as the continuous hot tack temperature range. The results are given in the accompanying Table.

EXAMPLE 2

Comparison

A three layer polymer web was produced and oriented as described in Example 1, the core and the propylene/ethylene copolymer layers being as described in Example 1 but the blend being replaced by a blend of the propylene/ethylene copolymer of Example 1 with a random but-1-ene/ethylene copolymer with an ethylene content of about 6 percent by weight and having a melt flow index of 8.0. The weight ratio of propylene/ethylene copolymer to the but-1-ene/ethylene copolymer was 2:3. The thickness of the core and outer layers were as in Example 1 following orientation.

The heat seal threshold temperature and the continuous hot tack temperature range were evaluated as in Example 1, the results being shown in the Table. The blend had a satisfactory heat seal threshold temperature but the continuous hot tack temperature range was too low.

EXAMPLE 3

A three layer polymer web was produced and oriented as described in Example 1 except the two component blend was replaced by a three component blend. The three component blend consisted of a mixture of the propylene/ethylene copolymer and the but-1-ene/ethylene copolymer used in Example 1, together with the but-1-ene/ethylene copolymer used in Example 2, the weight ratios of the copolymers being 4:5:1 respectively. The film had core and outer layer thicknesses as in Example 1.

The heat seal threshold temperature and the continuous hot tack temperature range for the blend were then evaluated and the results are given in the Table. Both properties were satisfactory.

EXAMPLE 4

A three layer polymeric film was produced as in Example 3, one outer layer consisting of a three component blend. The weight ratios of the propylene/ethylene copolymer and the but-1-ene/ethylene copolymer of Example 1 to the but-1-ene/ethylene copolymer of Example 2 were 5:1:4. The thicknesses of the core and the outer layers were as in Example 1.

The heat seal threshold temperature and the continuous hot tack temperature range were evaluated and both found to be satisfactory. The results are shown in the accompanying Table.

EXAMPLE 5

A three layer polymer web was produced as described in Example 1, except the core layer contained 5 weight percent of calcium carbonate having a mean particle size of 3 microns, and instead of the two component blend used for one of the outer layers, a three component blend was used consisting of the propylene/ethylene copolymer and the but-1-ene/ethylene copolymer of Example 1 with the but-1-ene/ethylene copolymer of Example 2, the weight ratios of the respective polymers in the outer layer being 4:1:5.

The thickness of the core after orientation, which had become voided and opaque as a result of the presence of the calcium carbonate, was about 37 microns, with the two outer layers each being about 1.5 microns thick. The film had an overall density of about 0.69.

The heat seal threshold temperature and the continuous hot tack temperature range were evaluated and both were found to be satisfactory, the results being shown in the accompanying Table.

EXAMPLE 6

A three layer polymeric film was produced as in Example 4, the weight ratios of the propylene/ethylene copolymer and the but-1-ene/ethylene copolymer of Example 1 to the but-1-ene/ethylene copolymer of Example 2 was 4:3:3 respectively.

The three component blend layer was provided with a friction modifying coating using a water-based silicone emulsion.

The heat seal threshold temperature and the continuous hot tack temperature range were then evaluated for the outer layer consisting of the polymer blend, and the results are given in the accompanying Table.

TABLE

| Example | Outer Layer Thickness (microns) | HSTT (°C.) | CHTTR (°C.) |
| --- | --- | --- | --- |
| 1 | 0.8 | 101.0 | 75–135 |
| 2 | 0.8 | 72.0 | 50–100 |
| 3 | 0.8 | 91.3 | 60–140 |

TABLE-continued

| Example | Outer Layer Thickness (microns) | HSTT (°C.) | CHTTR (°C.) |
| --- | --- | --- | --- |
| 4 | 0.8 | 89.6 | 60-130 |
| 5 | 1.6 | 77.2 | 60-130 |
| 6 | 0.8 | 93.8 | 60-130 |

I claim:

1. A heat sealable polymeric film, heat sealing being provided by a blend of
   (a) from 25 to 75 percent of propylene/ethylene copolymer containing from 2 to 8 percent by weight of units derived from ethylene;
   (b) from 1 to 60 percent of but-1-ene/ethylene copolymer containing up to 1 percent by weight of units derived from ethylene; and
   (c) from 1 to 60 percent of but-1-ene/ethylene copolymer containing from 3 to 10 percent by weight of units derived from ethylene;
the percentages of the various copolymers being based on the total weight of the blend.

2. A film according to claim 1, wherein the heat sealing is provided by a relatively thin layer of the said blend on a relatively thick layer of another polymer.

3. A film according to claim 2, wherein the said relatively thick layer of another polymer has a relatively thin layer of the said blend on each surface thereof.

4. A film according to claim 1, wherein the blend contains from 30 to 50 percent by weight of propylene-/ethylene copolymer.

5. A film according to claim 1, wherein the propylene/ethylene copolymer of the blend contains from 3.5 to 4.5 percent by weight of units derived from ethylene.

6. A film according to claim 1, wherein the propylene/ethylene copolymer of the blend has a melt flow index of from 3 to 10.

7. A film according to claim 1, wherein the blend contains from 5 to 55 percent of component (b).

8. A film according to claim 1, wherein component (b) of the blend contains from 0.3 to 0.8 percent by weight of units derived from ethylene.

9. A film according to claim 1, wherein component (b) of the blend has a melt flow index of from 1.5 to 10.

10. A film according to claim 1, wherein the blend contains from 5 to 55 percent by weight of component (c).

11. A film according to claim 1, wherein component (c) of the blend contains from 5 to 7 percent by weight of units derived from ethylene.

12. A film according to claim 1, wherein component (c) of the blend has a melt flow index of from 3 to 40.

13. A film according to claim 1, wherein the blend forms a heat sealable layer on a non-voided propylene homopolymer layer.

14. A film according to claim 1 wherein the blend forms a heat sealable layer on a voided propylene homopolymer layer.

15. A film according to claim 1, wherein the propylene/ethylene copolymer of the blend has a melt flow index of from 5 to 8.

16. A film according to claim 1, wherein component (b) of the blend has a melt flow index of from 3 to 6.

17. A film according to claim 1, wherein component (c) of the blend has a melt flow index of from 7 to 9.

* * * * *